United States Patent [19]
Lee

[11] 4,264,091
[45] Apr. 28, 1981

[54] ANCHORAGE SYSTEM FOR RESTRAINT BELT

[75] Inventor: David N. Lee, Almont, Mich.

[73] Assignee: General Motors Corporation, Detroit, Mich.

[21] Appl. No.: 97,210

[22] Filed: Nov. 26, 1979

[51] Int. Cl.³ ............................................. A62B 35/00
[52] U.S. Cl. .................................... 280/804; 280/806; 297/473
[58] Field of Search ............... 280/801, 802, 803, 804, 280/805, 806, 807; 297/468, 469, 473, 474, 475, 476, 477, 478, 479, 480, 486

[56] References Cited

U.S. PATENT DOCUMENTS

| | | | |
|---|---|---|---|
| 3,494,664 | 2/1970 | States | 297/468 |
| 3,606,454 | 9/1971 | Dorn | 297/468 |
| 3,940,164 | 2/1976 | Non | 280/804 |
| 4,025,110 | 5/1977 | Poorman | 297/468 |
| 4,109,962 | 8/1978 | Magyar | 297/468 X |

*Primary Examiner*—Randolph A. Reese
*Assistant Examiner*—Randall A. Schrecengost
*Attorney, Agent, or Firm*—Charles E. Leahy

[57] ABSTRACT

An anchorage system for mounting an inertia locking restraint belt retractor for fore and aft adjusting movement with a vehicle seat mounted on the vehicle body by a seat adjusting mechanism which tilts the seat as well as adjusting the seat fore and aft. According to the invention a track extends longitudinally on the vehicle body generally beneath the seat and mounts a carriage having the retractor mounted thereon. A flexible strap or the like connects the carriage with the seat to tow the carriage fore and aft with the seat and permit tilting movement of the seat relative the carriage while the track and carriage maintain the retractor at a predetermined attitude which insures operation of the retractor sensing mechanism. An anchor belt has its rearward end connected to the vehicle floor and its forward end connected to the carriage by an inertia locking anchor belt retractor to lock the carriage against forward movement by occupant restraint loads imposed on the restraint belt.

3 Claims, 3 Drawing Figures

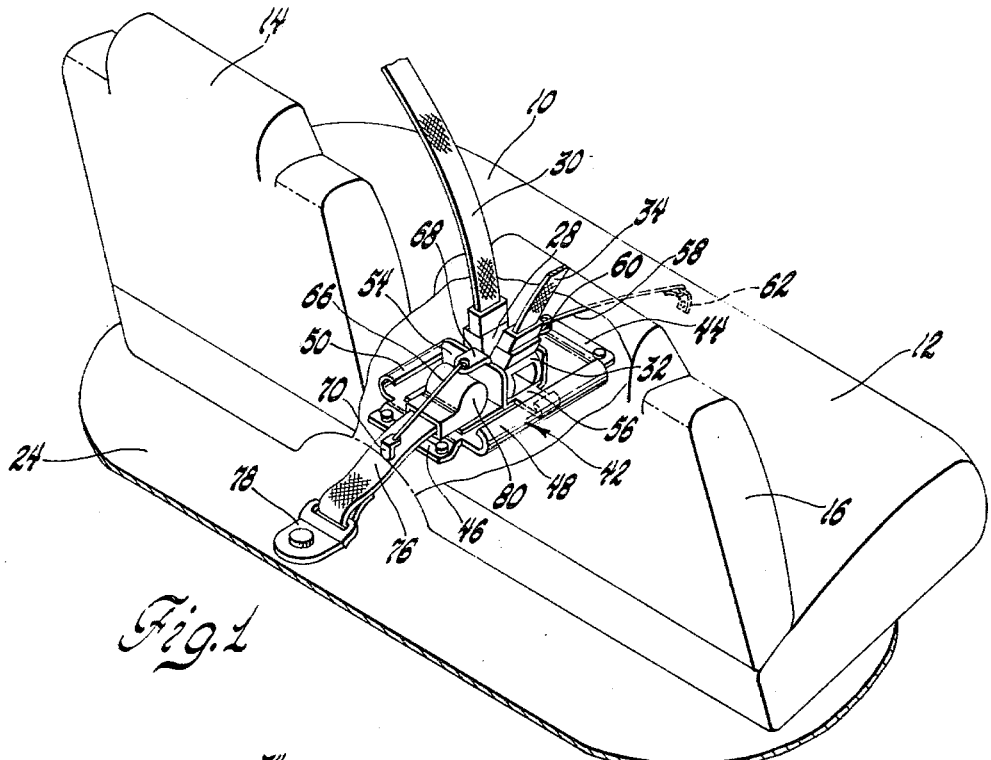
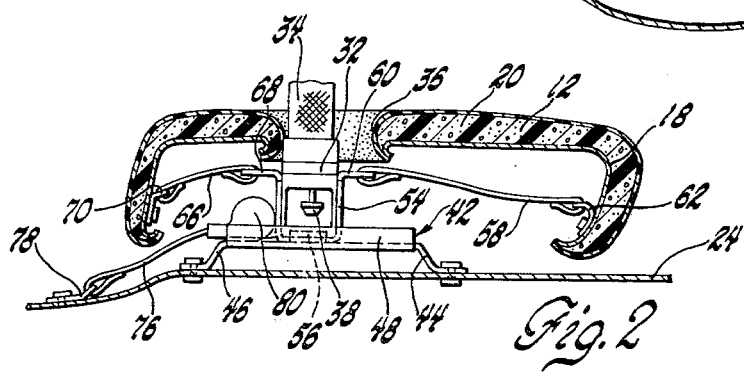
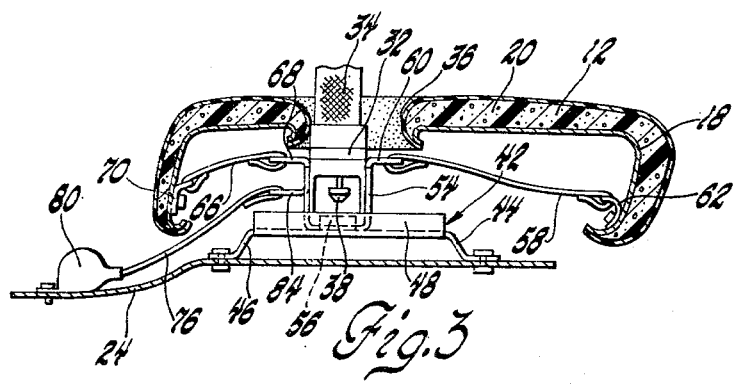

ANCHORAGE SYSTEM FOR RESTRAINT BELT

The invention relates to a restraint belt system and more particularly to an anchorage system mounting an inertia locking restraint belt retractor for longitudinal adjusting movement with a vehicle seat which tilts and moves longitudinally fore and aft.

BACKGROUND OF THE INVENTION

Conventional restraint belt systems employ a belt buckle or belt retractor which is positioned inboard the occupant seating position to mount the inboard end of a occupant restraint belt.

It has been proposed that the inboard belt end be mounted on the vehicle seat so as to move with the seat during fore and aft seat adjustment. It has been recognized that such a direct mounting of the restraint belt end on the seat has the disadvantage of requiring that the seat adjusting mechanism be strong enough to maintain the seat against movement by the occupant restraint loads imposed on the belt. Accordingly, prior patents such as Dorn U.S. Pat. No. 3,606,454, issued Aug. 21, 1969, and Magyar U.S. Pat. No. 4,109,962, issued Aug. 29, 1978, have proposed that an anchor strap separate from the restraint belt have one end mounted on the vehicle floor rearward the seat and the other end mounted on the seat frame. A spring wound retractor reel provides the mounting of one of the anchor belt ends and is selectively locked to anchor the seat against forward movement by the occupant restraint load.

Conventional passive restraint belt systems have an outboard belt end connected to the vehicle door and an inboard end mounted by a retractor so that opening and closing movement of the door automatically moves the restraint belt between the restraining and non-restraining positions. The restraint belt retractor is preferably of the vehicle inertia sensitive type having a pendulum or the like which automatically fixes the length of the restraint belt in response to a predetermined change in vehicle velocity or attitude. It is characteristic of vehicle inertia sensitive retractors that the retractor must be mounted at a predetermined fixed attitude in the vehicle so that the pendulum always hangs vertically to lock the retractor at a consistency predictable level of change of vehicle velocity or attitude. The forward and rearward tilting movement of a vehicle seat undesirably influences the performance of the inertia locking seat belt retractor and accordingly prevents the mounting of such a retractor on the seat.

The present invention provides a new and improved seat belt anchorage system by which the vehicle inertia sensitive locking restraint belt retractor may be mounted for adjusting fore and aft adjusting movement with a vehicle bench seat which tilts as well as moving fore and aft.

SUMMARY OF THE INVENTION

According to the invention, an inertia locking restraint belt retractor has a pendulum which locks the retractor in response to a predetermined change in vehicle velocity or attitude. The seat is mounted on the vehicle body by an adjusting mechanism which permits longitudinal fore and aft adjusting movement of the seat as well as forward and rearward tilting movement of the seat. A track extends longitudinally on a vehicle body generally beneath the seat. A carriage is movable along the track in the fore and aft direction and has the restraint belt retractor mounted thereon to permit longitudinal adjusting movement of the retractor with the seat while maintaining the retractor pendulum at the predetermined attitude. A flexible strap or the like connects the carriage with the seat to tow the carriage fore and aft with the seat and permits tilting movement of the seat relative the carriage. An anchor belt has its rearward end connected to the vehicle floor and its forward end connected to the carriage by an anchor belt retractor having a pendulum which locks the retractor and fixes the length of the anchor belt upon occurrence of predetermined vehicle velocity or attitude change so that the carriage is locked against forward movement by occupant restraint loads applied against on restraint belt.

One object, feature and advantage of the invention resides in the provision of longitudinally extending track and carriage assembly mounted beneath the vehicle seat for mounting a restraint belt retractor for fore and aft adjusting movement with the seat irrespective of tilting movement of the seat.

Another object, feature and advantage of the invention resides in the provision of a restraint belt retractor mounted inboard the occupant seating position by a fore and aft movable carriage which is connected to the vehicle seat by a flexible strap permitting tilting movement of the seat while the carriage and retractor remain stationary.

BRIEF DESCRIPTION OF THE DRAWINGS

These and other features, objects and advantages of the invention will become apparent upon consideration of the specification and the drawings in which:

FIG. 1 is a perspective view of a vehicle seat and restraint belt installation having the restraint belt retractor mounted for fore and aft adjusting movement independently of tilting movement of the occupant seat;

FIG. 2 is a side elevation sectional view of the seat and restraint belt system embodying the inventions; and FIG. 3 is a view similar to FIG. 2 but showing a modification of the invention.

DESCRIPTION OF THE PREFERRED EMBODIMENT

Referring to FIG. 1, there is shown a vehicle bench seat 10 including a seat bottom 12, a driver seat back 14, and a passenger seat back 16.

Referring to FIG. 2, it is seen that the seat bottom 12 includes a seat frame 18 and a seat cushion 20.

The bench seat 10 is mounted on the vehicle floor 24 by a seat adjusting mechanism, not shown, of the type which moves the seat 10 longitudinally fore and aft as well as tilting the seat forward and rearward. A typical seat adjusting mechanism of this type is the so-called six-way seat adjusting mechanism of U.S. Pat. No. 3,188,044, issued June 8, 1965. Seat adjusting mechanisms of this type will tilt the seat forward and rearward through a range of about 15 degrees.

Referring to FIG. 1 it is seen that a restraint belt retractor 28 is provided for winding a restraint belt 30 having its outer end suitably fixed to the vehicle door so that the belt 30 is automatically moved between restraining and unrestraining positions by movement of the door between the open and closed positions. Another restraint belt retractor 32 is provided for likewise winding a restraint belt 34 for restraint of the vehicle passenger. The restraint belts 30 and 34 pass through an opening 36 in the seat bottom 12.

Each of the restraint belt retractors 28 and 32 has a pendulum 38, best seen in FIG. 2, which senses a predetermined change in vehicle velocity or attitude to lock the retractor and thereby prevent unwinding of the restraint belt. It is characteristic of the retractors 28 and 32 that the pendulum 38 must be mounted at a predetermined constant vertical attitude in order to consistently and predictably sense the desired change in vehicle velocity attitude.

Referring to FIGS. 1 and 2, it is seen that a track 42 has a forward leg 44 and a rearward leg 46 which are suitably bolted to the vehicle floor 24. The lateral edges of the track 42 are curled inwardly to define flanges 48 and 50. A stamped steel carriage 54 has laterally extending legs 56 which are captured by flanges 48 and 50 of the track 42 to mount the carriage 54 for fore and aft longitudinal movement. The restraint belt retractors 28 and 32 are mounted on the carriage 54 at the predetermined attitude which establishes the pendulum 38 at the desired vertical attitude. A flexible strap 58 has one end attached to a tab 60 of the carriage 54 and other end connected to the forward portion of the seat frame 18 by a bracket 62. Another flexible strap 66 is likewise attached to a tab 68 of the carriage and to the rearward portion of the seat frame 18 by the bracket 70. The flexible straps 58 and 66 are effective to tow the carriage 54 forwardly and rearwardly with the seat 10 and flex upon tilting movement of the seat 10 so that the carriage 54 maintains the retractors 28 and 32 at the predetermined attitude relative the vehicle body irrespective of the tilting movement of the seat 10.

An anchor belt 76 has its rearward end attached to the vehicle floor 24 by an anchor bracket 78 and its forward end connected to an anchor belt retractor 80. The anchor belt retractor 80 is mounted on the carriage 54 for longitudinal fore and aft movement therewith. The anchor belt retractor 80 also has a pendulum associated therewith to sense a predetermined change in vehicle velocity or attitude and lock the retractor to fix the length of the anchor belt 76.

In summary, the restraint belt retractors 28 and 32 remain unlocked during normal vehicle operation so that the vehicle door may be opened to permit occupant ingress and egress. Furthermore, the anchor belt retractor 80 will remain unlocked so that the occupant may adjust the vehicle seat forwardly and rearwardly. During such forward and rearward adjusting movement of the seat, the tow straps 58 and 66 tow the carriage 54 fore and aft so that the restraint belt retractors 28 and 32 travel fore and aft therewith to maintain the restraint belts 30 and 34 at a consistent location relative the seated vehicle occupant. The seat occupant may also operate the seat adjusting mechanism in a manner to tilt the seat forward and rearward. During such tilting movement of the seat, the two flexible straps 58 and 66 flex to permit the carriage 54 and the restraint belt retractors 28 and 32 to remain at their predetermined attitude determined by the track 42.

Upon occurrence of a predetermined change in vehicle velocity or attitude, the restraint belt retractors 28 and 32 and the anchor belt retractor 80 are locked by their respective pendulums 38. Accordingly, the length of the restraint belt 30 and 32 are fixed for effective restraint of the seated occupants. Furthermore, the length of anchor belt 76 is fixed so that the occupant restraint loads imposed upon the carriage 54 are carried by the track 42 and the anchor belt 76 without imposing the load on the tow straps 60 and 66 or the seat bottom 12.

FIG. 3 shows a modification of the invention in which the anchor belt retractor 80 is mounted on the vehicle floor 24 and the forward end of the anchor belt 76 is attached directly to the mounting tab 84 of the carriage 54.

While the invention has been disclosed primarily in terms of the specific embodiments shown in the drawings, it is not intended to be limited thereto but rather only to the extent set forth in the appended claims.

The embodiments of the invention in which an exclusive properly or privilege is claimed are defined as follows:

1. In combination with a motor vehicle body having an occupant seat mounted on the vehicle body by a seat adjusting mechanism providing longitudinal movement of the occupant seat, a restraint belt anchorage comprising:

a restraint belt retractor having an associated mechanism adapted to selectively lock the restraint belt;

a carriage having the restraint belt retractor mounted thereon;

a track independent of the seat adjusting mechanism extending longitudinally on the vehicle body generally adjacent the occupant seating position and mounting the carriage for longitudinal adjusting movement;

means adapted to selectively lock the carriage against forward movement along the track;

and means operatively connecting the carriage with the seat to tow the carriage fore and aft with the seat during longitudinal adjusting movement of the seat.

2. In combination with a motor vehicle body having an occupant seat mounted on the vehicle body by a seat adjusting mechanism providing longitudinal and tilting movement of the occupant seat, a seat belt system comprising:

a restraint belt retractor adapted for mounting on the vehicle body and having an associated sensing mechanism effective when mounted at a predetermined attitude on the vehicle body to lock the retractor in response to a predetermined change in vehicle velocity or attitude;

a track extending longitudinally on the vehicle body generally adjacent and beneath the seat;

a carriage movable along the track in the longitudinal fore and aft direction and having the restraint belt retractor mounted thereon, said track and carriage cooperating to permit longitudinal movement of the retractor while maintaining the sensing mechanism at the predetermined attitude;

a non-load bearing flexible strap connecting the carriage with the seat to tow the carriage fore and aft with the seat and permit tilting movement of the seat relative the carriage to maintain the sensing mechanism at the predetermined attitude irrespective of tilting movement of the seat by the seat adjusting mechanism;

an anchor belt having one end mounted on the vehicle body rearwardly of the seat and another end mounted on the carriage;

and an anchor belt retractor providing the mounting of one of the anchor belt ends, said anchor belt retractor normally retracting and extending the anchor belt to permit fore and aft adjusting movement of the carriage with the seat and having an associated sensing mechanism to lock the retractor against anchor belt extension in response to predetermined change in vehicle velocity or attitude to restrain the carriage against forward movement.

3. In combination with a motor vehicle body having an occupant seat mounted on the vehicle body by a seat adjusting mechanism providing longitudinal and tilting movement of the occupant seat, a restraint belt anchorage comprising:

a restraint belt retractor having an associated sensing mechanism effective when mounted at a predetermined attitude on the vehicle body to lock the restraint belt in response to a predetermined vehicle velocity change;

a carriage having the restraint belt retractor mounted thereon;

a track extending longitudinally on the vehicle body generally adjacent the occupant seating position and mounting the carriage for longitudinal movement while maintaining the sensing mechanism at the predetermined attitude;

means adapted to selectively lock the carriage against forward movement along the track;

and means operatively connecting the carriage with the seat to tow the carriage fore and aft with seat and permit tilting movement of the seat relative the carriage whereby the sensing mechanism associated with the restraint belt retractor is maintained at the predetermined attitude irrespective of tilting movement of the seat by the seat adjusting mechanism.

* * * * *